Dec. 14, 1948.   A. MARCHAND   2,456,071
SHOCK-ABSORBING DEVICE FOR PIVOTS
OF WATCH BALANCE STAFFS
Filed Oct. 23, 1945

Inventor
A. Marchand
By Glascock Downing Seebirth
Attys

Patented Dec. 14, 1948

2,456,071

UNITED STATES PATENT OFFICE 2,456,071

SHOCK-ABSORBING DEVICE FOR PIVOTS OF WATCH BALANCE STAFFS

Adamir Marchand, La Chaux de Fonds, Switzerland, assignor to Benrus Watch Company, Inc., New York, N. Y., a corporation of New York Application October 23, 1945, Serial No. 623,957
In Switzerland March 29, 1945

5 Claims. (Cl. 58—140)

This invention relates to shock-absorbing bearings for pivots of watch balance staffs and has for its object to provide protecting means which are of simple construction and efficient to protect the pivots of watch balance staffs from damage due to both axial and radial shocks without permitting the lubricant to spread out from the oil sump provided between the cap jewel and the pierced jewel.

With this and other objects in view, the invention consists of certain novel features which will be more fully described and ascertained in the appending claims.

Figure 1:
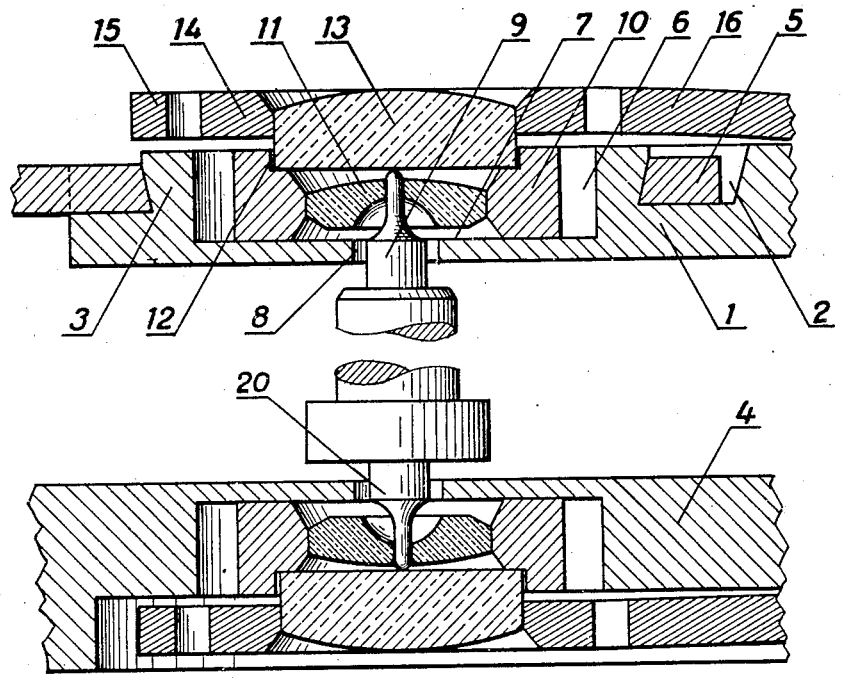
Figure 2:
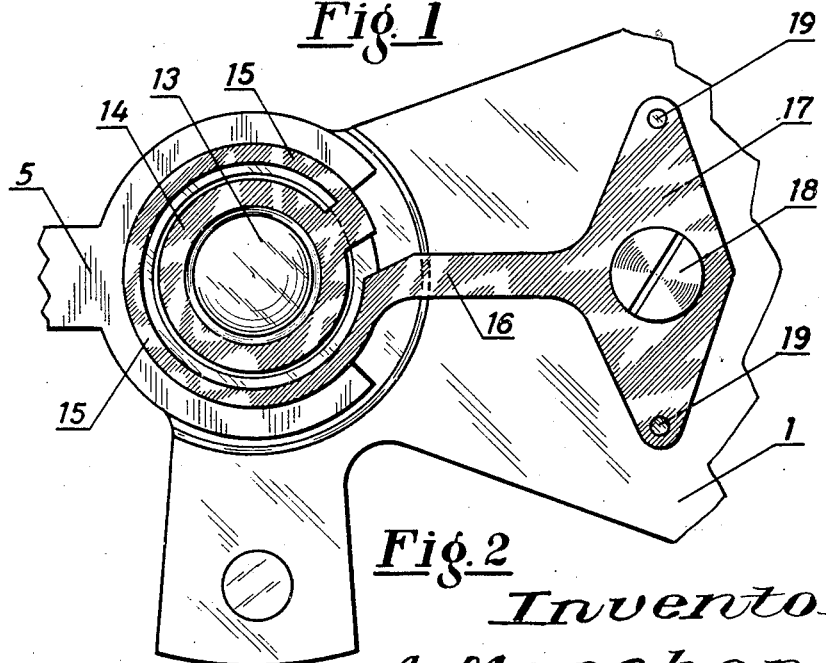

An embodiment of the invention is illustrated in the accompanying drawings, in which:

Fig. 1 is an axial section of the bearings for both the pivoted ends of a balance staff and, Fig. 2 is a plan view from the side of the balance-bridge.

In the dawings, 1 designates the balance bridge having an annular groove 2 adjacent a rib 3 on which the regulator 5 is rotatably mounted. In the balance bridge, coaxially to the regulator supporting rib 3 there is provided a circular recess 6 in the flat bottom 7 of which is pierced a hole 8 for the passage of the upper pivot 9 of the balance staff. On the flat bottom 7 of the recess 6 rests freely a bearing body 10 consisting of a metal ring in which is forced a pierced jewel 11. The diameter of the recess 6 is larger than the outer diameter of the bearing body 10, so as to allow the latter to be freely displaced in any direction upon a radial or axial shock on the pivot. In the outer face of the bearing body 10 is cut a circular groove 12 in which is engaged and rests freely the base of a cap-jewel 13. This cap-jewel 13 has its outer part forced in the eye 14 of the inner end of a spiral spring 15. The outer end of the spiral spring 15 is provided with a radial extension 16, the extremity of which is enlarged so as to form a sole 17 which serves to fix the spring onto the balance bridge 1 by means of a screw 18 and two pins engaging the holes 19 of the bridge 1. The spring 15, owing to its spiral shape and to the fact that its spiral is placed at the extremity of the radial extension 16, is adapted to act on the cap jewel 13 in all the directions, axially as well as radially.

Upon an axial shock, the upper pivot 9 of the balance staff raises the cap jewel 13 which is dependent on the spring 15; owing to the capillarity of the lubricant comprised between the lower face of the cap jewel 13 and the upper face of the pierced jewel 11, the latter follows with its setting 10 the displacement of the cap jewel 13; so that the lubricant is not allowed to spread out although the cap jewel 13 is not secured to the bearing body. Upon a radial shock, it is the pierced jewel 11 dependent on the bearing body 10 which takes up in its radial displacement the cap jewel 13 the base of which is engaged freely in the groove 12 of the bearing body. The radial shocks as well as the axial shocks are thus absorbed by the spring 15 which then centers the whole bearing again.

The construction described permits to use pierced jewels and cap jewels of normal diameter. The mounting and dismounting of the pieces are simple and easy. It suffices to screw or unscrew the screw 18. The centering of the spring 15 is secured by the pins of the sole 17 cooperating with the holes 19 of the balance bridge. A similar device is provided for the lower pivot 20 of the balance staff; the recess 6 for the bearing is cut in the base plate 4 instead of the balance bridge 1.

What I claim is:

1. In a watch movement, a balance staff pivot, a balance bridge having a recess, said bridge having an opening in the bottom of said recess for the passage of said pivot, a bearing body spaced from the side walls of said recess, rested freely on the bottom thereon and movable thereon transversely to the axis of the pivot, a pierced jewel set in said bearing body and receiving the end of said pivot, the inner wall of said bearing body having a groove spaced apart from the outer face of said pierced jewel, a cap jewel freely rested in said groove and supporting said pivot, a spiral spring having its outer end fastened to said balance bridge and having a central hole at its inner end, said cap jewel being set in said central hole, said spring being so conformed as to allow radial as well as axial yielding displacement of said cap jewel, and lubricant within the space between the adjacent faces of said pierced and cap jewels, whereby upon axial shock on said pivot, said pierced jewel follows said cap jewel in its yielding displacement under the capillary action of said lubricant and upon radial shock said bearing body is moved transversely within said recess and takes up said cap jewel against the radial centering action of said spring.

2. A shock-absorbing bearing for the pivot of a watch balance staff comprising a bearing support, a bearing body mounted on but freely movable with respect to the bearing support, a pierced jewel for the staff pivot fixedly carried by the bearing body, a cap jewel for the staff pivot, the cap jewel and the bearing body being fitted one into the other for joint radial displacement but with a free axial engagement therebetween, and a shock-absorbing spring fastened to the support and fixedly carrying the cap jewel.

3. A shock-absorbing bearing for the pivot of a watch balance staff comprising a balance bridge, a bearing body mounted on but freely movable axially and radially with respect to the balance bridge, a pierced jewel for the staff pivot fixedly carried by the bearing body, a cap jewel for the staff pivot, the cap jewel and the bearing body being fitted one into the other for joint radial displacement but with a free axial engagement therebetween, and a shock-absorbing spring fastened to the balance bridge and fixedly carrying the cap jewel.

4. A shock-absorbing bearing for the pivot of a watch balance staff comprising a bearing support, a bearing body mounted on but freely movable with respect to the bearing support, a pierced jewel for the staff pivot fixedly carried by the bearing body, a cap jewel for the staff pivot, and a spiral spring fastened to the support and fixedly carrying the cap jewel, the said spring acting to absorb the axial and radial shocks and to center the bearing again after the shocks, the cap jewel and the bearing body being fitted one into the other for joint radial displacement but with a free axial engagement therebetween, whereby upon an axial shock the pierced jewel follows the cap jewel under the action of the capillarity of the lubricant between the jewels, and upon a radial shock the bearing body takes up the cap jewel against the radial centering action of the spiral spring.

5. A shock-absorbing bearing for the pivot of a watch balance staff comprising a bearing support provided with a recess, a bearing body resting freely on the bottom of said recess and freely movable with respect to the bearing support, a pierced jewel for the staff pivot fixedly carried by the bearing body, a cap jewel for the staff pivot, and a spiral spring fastened to the support and fixedly carrying the cap jewel on its inner end, the said spring acting to absorb the axial and radial shocks and to center the bearing again after the shocks, the bearing body having a groove and the cap jewel fitting into but being freely engaged by its base in said groove, whereby upon an axial shock the pierced jewel follows the cap jewel under the action of the capillarity of the lubricant between the jewels, and upon a radial shock the bearing body takes up the cap jewel against the radial centering action of the spiral spring.

ADAMIR MARCHAND.

REFERENCES CITED

The following references are of record in the file of this patent:

UNITED STATES PATENTS

| Number | Name | Date |
|---|---|---|
| 482,585 | Newton | Sept. 13, 1892 |
| 1,128,068 | Sokolowski | Feb. 9, 1915 |
| 1,236,175 | Hopewell | Aug. 7, 1917 |
| 2,146,329 | Colomb | Feb. 7, 1939 |
| 2,242,712 | Sadovsky et al. | May 20, 1941 |

FOREIGN PATENTS

| Number | Country | Date |
|---|---|---|
| 148,030 | Switzerland | Sept. 16, 1931 |
| 199,832 | Switzerland | Nov. 16, 1938 |